United States Patent
Justus et al.

(10) Patent No.: US 11,651,511 B2
(45) Date of Patent: May 16, 2023

(54) COMPUTER VISION SYSTEMS AND METHODS FOR DETERMINING ROOF SHAPES FROM IMAGERY USING SEGMENTATION NETWORKS

(71) Applicant: Insurance Services Office, Inc., Jersey City, NJ (US)

(72) Inventors: Ryan Mark Justus, Lehi, UT (US); Bryce Zachary Porter, Lehi, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/716,623

(22) Filed: Apr. 8, 2022

(65) Prior Publication Data
US 2022/0327722 A1   Oct. 13, 2022

Related U.S. Application Data

(60) Provisional application No. 63/172,286, filed on Apr. 8, 2021.

(51) Int. Cl.
*G06T 7/60* (2017.01)
*G06T 7/11* (2017.01)

(52) U.S. Cl.
CPC ............. *G06T 7/60* (2013.01); *G06T 7/11* (2017.01); *G06T 2207/10032* (2013.01); *G06T 2207/20084* (2013.01)

(58) Field of Classification Search
CPC ... G06T 7/60; G06T 7/11; G06T 2207/10032; G06T 2207/20084; G06V 20/176; G06V 10/26; G06V 10/82; G06Q 50/16
See application file for complete search history.

(56) References Cited

U.S. PATENT DOCUMENTS

| | | | |
|---|---|---|---|
| 10,607,295 B1* | 3/2020 | Hakimi-Boushehri | G06Q 50/16 |
| 11,392,728 B2* | 7/2022 | Porter | G06F 30/17 |
| 11,450,076 B2* | 9/2022 | Martin de los Santos | G06T 17/05 |

(Continued)

OTHER PUBLICATIONS

Axelsson, Maria, et al. "Roof type classification using deep convolutional neural networks on low resolution photogrammetric point clouds from aerial imagery." 2018 IEEE International Conference on Acoustics, Speech and Signal Processing (ICASSP). IEEE, 2018. (Year: 2018).* Verma, Vivek, Rakesh Kumar, and Stephen Hsu. "3D building detection and modeling from aerial LIDAR data." 2006 IEEE Computer Society Conference on Computer Vision and Pattern Recognition (CVPR'06). vol. 2. IEEE, 2006. (Year: 2006).*

(Continued)

*Primary Examiner* — Bobbak Safaipour
(74) *Attorney, Agent, or Firm* — McCarter & English, LLP

(57) ABSTRACT

Computer vision systems and methods for determining roof shapes from imagery using segmentation networks are provided. The system obtains an image of a structure from an image database, and determines a flat roof structure ratio and a sloped roof structure ratio of the roof structure using a neural network. Based on segmentation processing by the neural network, the system determines a flat roof structure ratio and a sloped roof structure ratio based on a portion of the roof structure classified as being flat and a portion of the roof structure classified as being sloped. Then, the system determines a ratio of each shape type of the roof structure using a neural network. The system generates a roof structure shape report indicative of a predominant shape of the roof structure and ratios of each shape type of the roof structure.

34 Claims, 16 Drawing Sheets

(56) References Cited

U.S. PATENT DOCUMENTS

| | | | |
|---|---|---|---|
| 11,494,978 B2* | 11/2022 | Esteban | G06T 7/579 |
| 2014/0177945 A1 | 6/2014 | Pershing et al. | |
| 2014/0198978 A1 | 7/2014 | Chen et al. | |
| 2018/0053347 A1* | 2/2018 | Fathi | G06T 17/205 |
| 2018/0089763 A1* | 3/2018 | Okazaki | G06N 3/04 |
| 2019/0188516 A1 | 6/2019 | Porter et al. | |
| 2019/0385363 A1 | 12/2019 | Porter et al. | |
| 2021/0383481 A1 | 12/2021 | Richardson et al. | |
| 2021/0398346 A1* | 12/2021 | Valladolid | G06T 19/20 |
| 2021/0407188 A1* | 12/2021 | Mundy | G06T 15/04 |
| 2022/0043943 A1* | 2/2022 | Jalla | G01B 21/28 |
| 2022/0215622 A1* | 7/2022 | Stevens | G06T 17/05 |
| 2022/0215645 A1* | 7/2022 | Lebaron | G06T 7/12 |
| 2022/0229946 A1* | 7/2022 | Justus | G06F 30/13 |
| 2022/0350939 A1* | 11/2022 | Porter | G06F 3/04815 |
| 2022/0366646 A1* | 11/2022 | Lopez Gavilan | G06V 10/421 |
| 2022/0398805 A1* | 12/2022 | Raskob | G06V 20/188 |

OTHER PUBLICATIONS

International Search Report of the International Searching Authority dated Jun. 27, 2022, issued in connection with International Application No. PCT/US22/24054 (3 pages).

Written Opinion of the International Searching Authority dated Jun. 27, 2022, issued in connection with International Application No. PCT/US22/24054 (5 pages).

Castagno, et al., "Roof Shape Classification from LiDAR and Satellite Image Data Fusion Using Supervised Learning," Nov. 15, 2018, retrieved on Jun. 5, 2022 from https://www.mdpi.com/1424-8220/18/11/3960 (23 pages).

Lee. et al., "DeepRoof: A Data-Driven Approach for Solar Potential Estimation Using Rooftip Imagery," Proceedings of the 25th ACM SIGKDD International Conference on Knowledge Discovery & Data Mining, Aug. 8, 2019, retrieved on Jun. 5, 2022 from https://dl.acm.org/doi/abs/10.1145/3292500.3330741 (9 pages).

\* cited by examiner

54

```
┌─────────┐
│  Start  │
└────┬────┘
     ▼
```

70
Process Aerial Image Using a Neural Network to Detect and Classify Pixels of the Obtained Image Via Segmentation

72
Determine a Ratio of the Roof Structure that is Flat Based on the Classified Pixels Indicative of the Roof Structure

74
Determine a Ratio of the Roof Structure that is Sloped Based on the Determined Ratio of the Roof Structure that is Flat

```
┌─────────┐
│   End   │
└─────────┘
```

| Flat > Sloped | Rake > Hip | Predominant Shape |
|---|---|---|
| True | True | Flat |
| True | False | Flat |
| False | True | Gable |
| False | False | Hip |

| Predominant Shape | Hip |
|---|---|
| Flat Ratio | 0.25 |
| Hip Ratio | 0.5 |
| Rake Ratio | 0.25 |

| Roof Shape | Ratio |
|---|---|
| Flat | 0.25 |
| Hip | 0.5 |
| Rake | 0.25 |

FIG. 15

COMPUTER VISION SYSTEMS AND METHODS FOR DETERMINING ROOF SHAPES FROM IMAGERY USING SEGMENTATION NETWORKS

RELATED APPLICATIONS

The present application claims the priority of U.S. Provisional Application Ser. No. 63/172,286 filed on Apr. 8, 2021, the entire disclosure of which is expressly incorporated herein by reference.

BACKGROUND

Technical Field

The present disclosure relates generally to the field of computer modeling of structures. More particularly, the present disclosure relates to computer vision systems and methods for determining roof shapes from imagery using segmentation networks.

Related Art

Accurate and rapid identification and depiction of objects from digital images (e.g., aerial images, satellite images, etc.) is increasingly important for a variety of applications. For example, information related to various structures and/or features of buildings, such as roofs, walls, doors, etc., is often used by construction professionals to specify materials and associated costs for both newly-constructed buildings, as well as for repairing, replacing or upgrading existing structures. Further, in the insurance industry, accurate information about structures may be used to determine the proper costs for insuring buildings. For example, a predominant shape of a roof structure and roof ratios of each shape type (e.g., flat, hip or gable) of the roof structure are valuable sources of information for evaluating weather related risks and estimating costs for repairing or replacing a roof structure.

Various software systems have been implemented to process ground images, aerial images and/or overlapping image content of an aerial image pair to generate a three-dimensional (3D) model of a building present in the images and/or a 3D model of the structures thereof (e.g., a roof structure). However, these systems can be computationally expensive and have drawbacks, such as necessitating a plurality of image types (e.g., a ground and/or an aerial image) and/or views thereof (e.g., a nadir, a low oblique, and/or a high oblique view) for processing, missing camera parameter information associated with each ground and/or aerial image, and an inability to provide a higher resolution estimate of a position of each aerial image (where the aerial images overlap) to provide a smooth transition for display. Moreover, such systems often require manual inspection of the structures and/or features of buildings (e.g., a roof structure) by an individual to determine respective geometries and features of the structures and a modeler (e.g., a user) to generate accurate models of structures.

There is currently significant interest in developing systems that automatically determine a predominant shape of a roof structure and roof ratios of each shape type of the roof structure present in a single nadir aerial image requiring no (or, minimal) user involvement, and with a high degree of accuracy. As such, the ability to automatically determine a predominant shape of a roof structure and roof ratios of each shape type of the roof structure present in an aerial image (e.g., in a single nadir image), as well as generate a report of such attributes, without first performing a manual inspection of the roof structure to determine roof structure geometries and features thereof, is a powerful tool. Thus, what would be desirable is a system that automatically and efficiently determines a predominant shape of a roof structure and roof ratios of each shape type of the roof structure and generates reports of such attributes without requiring manual inspection of the roof structure. Accordingly, the computer vision systems and methods disclosed herein solve these and other needs.

SUMMARY

The present disclosure relates to computer vision systems and methods for determining roof shapes from imagery using segmentation networks. The system obtains an aerial image (e.g., a single nadir image) from an image database having a structure and corresponding roof structure present therein. In particular, the system receives a geospatial region of interest (ROI) specified by a user and obtains an aerial image associated with the geospatial ROI from the image database. Then, the system determines a flat roof structure ratio and a sloped roof structure ratio of the roof structure using a neural network, such as a segmentation network. Based on segmentation processing by the neural network, the system determines a flat roof structure ratio and a sloped roof structure ratio based on a portion of the roof structure classified as being flat and a portion of the roof structure classified as being sloped. Then, the system determines a ratio of each shape type of the roof structure using a neural network. In particular, the system utilizes the neural network to determine roof structure shape type ratios based on detected and classified roof lines of the roof structure. The system generates a roof structure shape report indicative of a predominant shape of the roof structure (e.g., flat, hip or gable) and ratios of each shape type of the roof structure (e.g., their respective contributions toward (percentages of composition of) the total roof structure).

BRIEF DESCRIPTION OF THE DRAWINGS

The foregoing features of the invention will be apparent from the following Detailed Description of the Invention, taken in connection with the accompanying drawings, in which:

FIG. 4 is a diagram illustrating step 54 of FIG. 2 in greater detail;

FIG. 13 is a diagram illustrating a roof structure decision table;

FIG. 14 is a diagram illustrating a roof structure shape report;

FIG. 15 is a diagram illustrating another embodiment of the roof structure shape report of FIG. 14.

DETAILED DESCRIPTION

The present disclosure relates to computer vision systems and methods for determining roof shapes from imagery using segmentation networks, as described in detail below in connection with FIGS. 1-16.

By way of background, the systems and methods of the present disclosure utilize an algorithm to automatically determine a shape of a roof structure associated with a building based on an aerial image (e.g., a single nadir image) of the building. A roof structure can include basic geometries (e.g., shapes) such as planar (e.g., flat), hip, and gable geometries, and can be defined by multiple sections of these basic roof structure shapes and the respective features thereof (e.g., roof lines). In particular, a flat roof structure can be defined as a roof structure or roof structure section having a small slope (e.g., a slope less than or equal to one inch rise over twelve inch run) without prominent ridges. Additionally, a hip roof structure can be defined as a roof structure or roof structure section having a sloped roof ridge formed by an intersection of two roof faces. It should be understood that a roof ridge can be flat (e.g., a horizontal roof segment formed by an intersection of two roof faces which each slope away from the intersection). Lastly, a gable roof structure can be defined as a roof structure or a roof structure section having sloped roof edges or rakes. It should be understood that a roof edge can also be flat (e.g., a horizontal roof edge or eave). A roof structure can include several other features or roof lines (e.g., an intersection of two planar sections of a roof structure or an edge of a roof structure) including, but not limited to, a sloped valley (e.g., a non-horizontal roof segment formed by an intersection of two roof faces which form concave roof surfaces), and a flat valley (e.g., a horizontal roof segment formed by an intersection of two roof faces which form concave roof surfaces).

The systems and methods of the present disclosure do not require a modeler (e.g., a user) to determine the aforementioned roof structure geometries and features thereof, and can be refined by a user to increase an accuracy of a roof structure shape determination. Additionally, the algorithm utilizes camera parameters to determine an image crop of a building of interest present in a nadir aerial image and does not utilize the camera parameters to determine a shape of a roof structure associated with the building.

Figure 1:
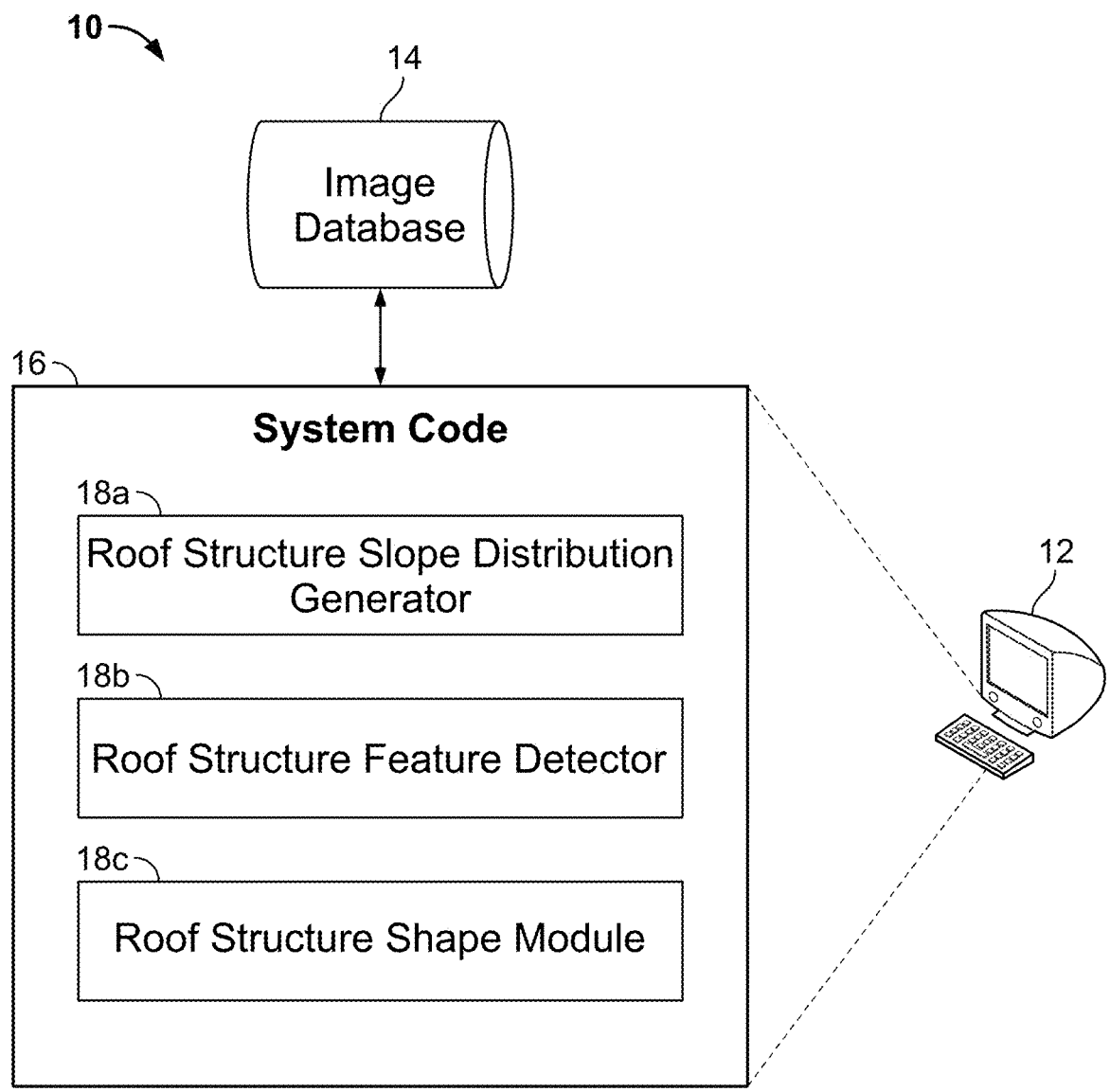
FIG. 1 is a diagram illustrating an embodiment of the system of the present disclosure.

Turning to the drawings, FIG. 1 is a diagram illustrating an embodiment of the system 10 of the present disclosure. The system 10 could be embodied as a central processing unit 12 (processor) in communication with an image database 14. The processor 12 could include, but is not limited to, a computer system, a server, a personal computer, a cloud computing device, a smart phone, or any other suitable device programmed to carry out the processes disclosed herein. The system 10 could determine a shape of a roof structure associated with a building or structure based on a building or structure present in an image obtained from the image database 14.

The image database 14 could include digital images and/or digital image datasets comprising aerial images, satellite images, etc. Further, the datasets could include, but are not limited to, images of residential and commercial buildings. The database 14 could store one or more three-dimensional representations of an imaged location (including structures at the location), such as point clouds, LiDAR files, etc., and the system 10 could operate with such three-dimensional representations. As such, by the terms "image" and "imagery" as used herein, it is meant not only optical imagery (including aerial and satellite imagery), but also three-dimensional imagery and computer-generated imagery, including, but not limited to, LiDAR, point clouds, three-dimensional images, etc. The processor 12 executes system code 16 which determines a shape of a roof structure using segmentation networks based on an image obtained from the image database 14 having a building or structure and corresponding roof structure present therein.

The system 10 includes system code 16 (non-transitory, computer-readable instructions) stored on a computer-readable medium and executable by the hardware processor 12 or one or more computer systems. The code 16 could include various custom-written software modules that carry out the steps/processes discussed herein, and could include, but is not limited to, a roof structure slope distribution generator 18a, a roof structure feature detector 18b, and a roof structure shape module 18c. The code 16 could be programmed using any suitable programming languages including, but not limited to, C, C++, C#, Java, Python or any other suitable language. Additionally, the code 16 could be distributed across multiple computer systems in communication with each other over a communications network, and/or stored and executed on a cloud computing platform and remotely accessed by a computer system in communication with the cloud platform. The code 16 could communicate with the image database 14, which could be stored on the same computer system as the code 16, or on one or more other computer systems in communication with the code 16.

Still further, the system 10 could be embodied as a customized hardware component such as a field-programmable gate array ("FPGA"), application-specific integrated circuit ("ASIC"), embedded system, or other customized hardware components without departing from the spirit or scope of the present disclosure. It should be understood that FIG. 1 is only one potential configuration, and the system 10 of the present disclosure can be implemented using a number of different configurations.

Figure 2:
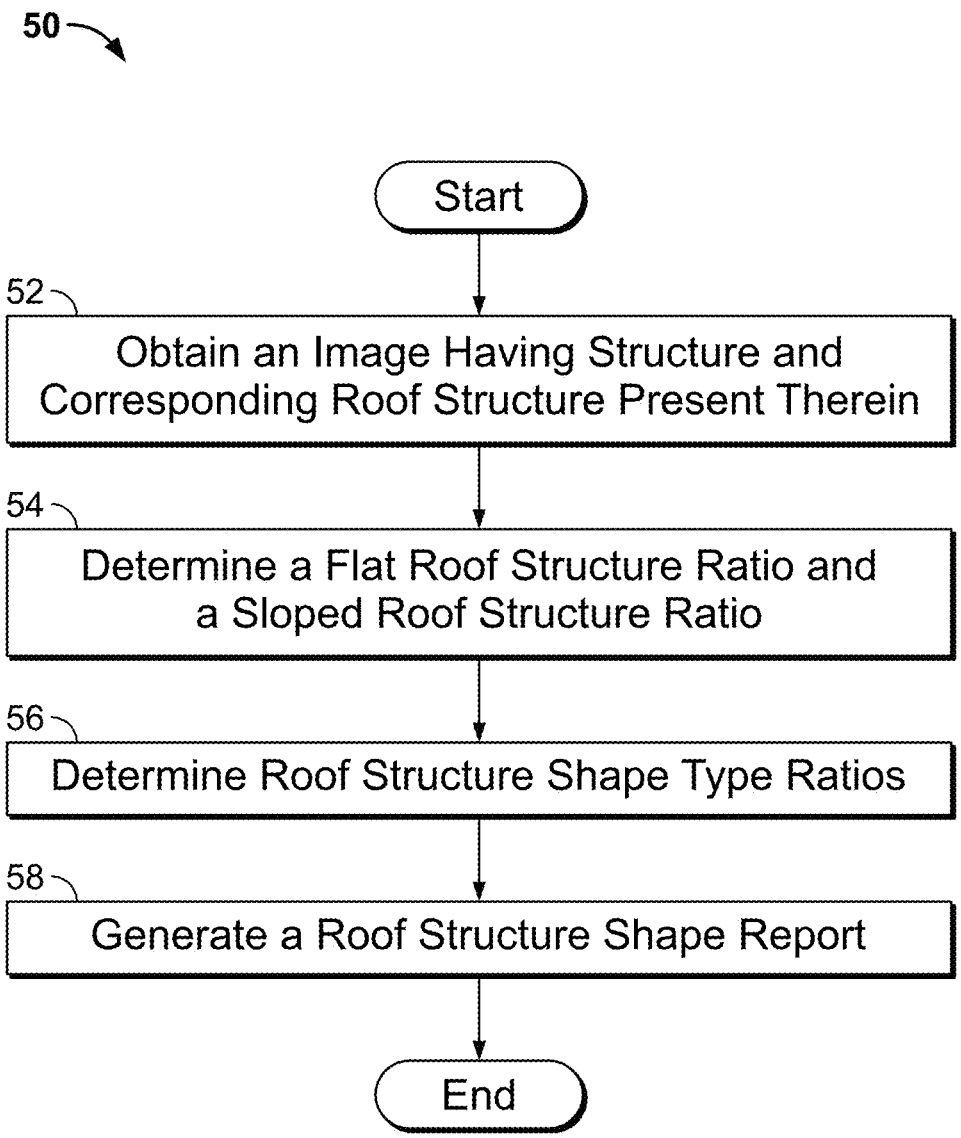
FIG. 2 is a flowchart illustrating overall processing steps carried out by the system of the present disclosure.

FIG. 2 is a flowchart illustrating overall processing steps 50 carried out by the system 10 of the present disclosure. Beginning in step 52, the system 10 obtains an image from the image database 14 having a structure and corresponding roof structure present therein. The image can be a single nadir aerial image, or any other suitable image. In step 54, the system 10 processes the image to determine a flat roof structure ratio and a sloped roof structure ratio using a neural network. In particular, the system 10 utilizes a semantic segmentation convolutional neural network to determine a flat roof structure ratio and a sloped roof structure ratio based on a portion of the roof structure classified as being flat and a portion of the roof structure classified as being sloped. Then, in step 56, the system 10 determines a ratio of each shape type of the roof structure using a neural network. In particular, the system 10 utilizes the neural network to determine roof structure shape type ratios based on detected and classified roof lines of the roof structure. In step 58, the system 10 generates a roof structure shape report indicative of a predominant shape of the roof structure (e.g., flat, hip or gable) and ratios of each shape type of the roof structure (e.g., their respective contributions toward (percentages of composition of) the total roof structure).

Figure 3:
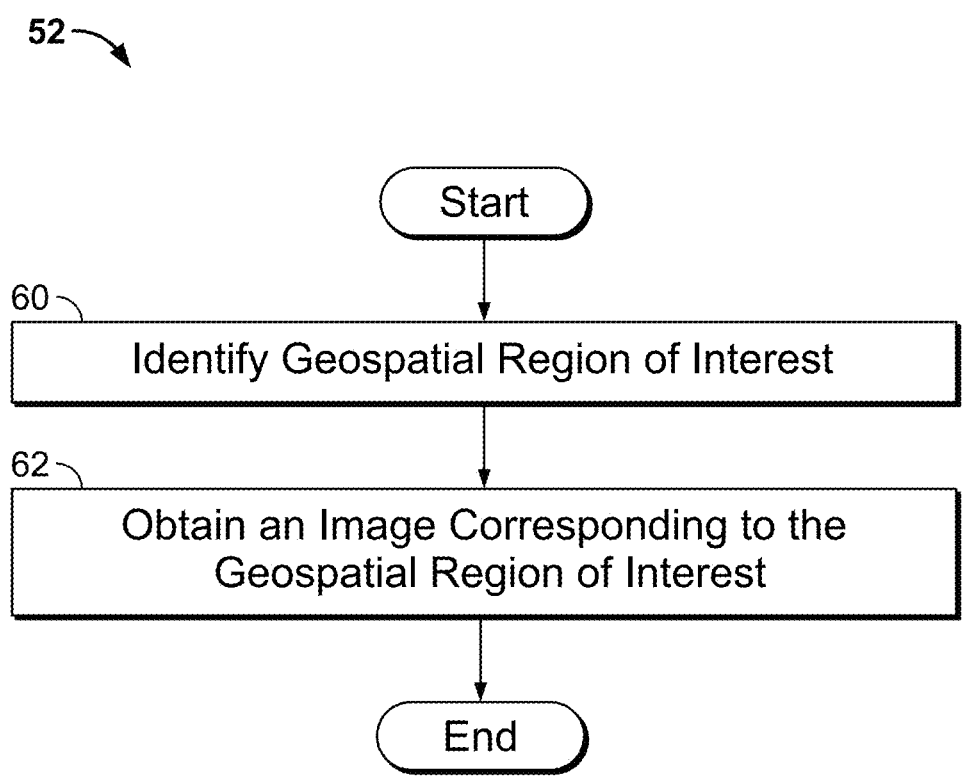
FIG. 3 is a flowchart illustrating step 52 of FIG. 2 in greater detail.

FIG. 3 is a flowchart illustrating step 52 of FIG. 2 in greater detail. Beginning in step 60, the system 10 identifies a geospatial region of interest (ROI) specified by a user. For example, a user can input latitude and longitude coordinates of an ROI. Alternatively, a user can input an address or a world point of an ROI. The geospatial ROI can be represented by a generic polygon enclosing a geocoding point indicative of the address or the world point. The region can be of interest to the user because of one or more structures present in the region. A property parcel included within the ROI can be selected based on the geocoding point. As discussed in further detail below, a deep learning neural network can be applied over the area of the parcel to detect a structure or a plurality of structures situated thereon.

The geospatial ROI can also be represented as a polygon bounded by latitude and longitude coordinates. In a first example, the bound can be a rectangle or any other shape centered on a postal address. In a second example, the bound can be determined from survey data of property parcel boundaries. In a third example, the bound can be determined from a selection of the user (e.g., in a geospatial mapping interface). Those skilled in the art would understand that other methods can be used to determine the bound of the polygon. The ROI may be represented in any computer format, such as, for example, well-known text ("WKT") data, TeX data, HTML data, XML data, etc. For example, a WKT polygon can comprise one or more computed independent world areas based on the detected structure in the parcel.

In step 62, after the user inputs the geospatial ROI, the system 10 obtains an aerial image (e.g., a single nadir image) associated with the geospatial ROI from the image database 14. As mentioned above, the images can be digital images such as aerial images, satellite images, etc. However, those skilled in the art would understand that any type of image captured by any type of image capture source. For example, the aerial images can be captured by image capture sources including, but not limited to, a plane, a helicopter, a paraglider, a satellite, or an unmanned aerial vehicle (UAV). It should be understood that multiple images can overlap all or a portion of the geospatial ROI and that the images can be orthorectified and/or modified if necessary.

FIG. 4 is a flowchart illustrating step 54 of FIG. 2 in greater detail. In step 70, the system 10 processes the aerial image using a neural network to detect and classify pixels of a roof structure present in the obtained image via segmentation. It should be understood that the system 10 can utilize any neural network which is trained to segment a roof structure. For example, the system 10 can utilize a semantic segmentation convolutional neural network to classify each pixel of the roof structure according to various classes including, but not limited to, a background class, a flat roof structure class and a sloped roof structure class. It should be understood that additional classes can be included to classify pixels associated with particular roof structure features (e.g., a chimney) and/or neighboring structures (e.g., a pergola, a terrace, or a gazebo). Pixels classified as neighboring structures can be labeled as background to reduce label computational processing and to avoid necessitating an instance based building mask as an additional input at inference time.

Based on the neural network segmentation processing, in step 72, the system 10 determines a ratio of the roof structure that is flat based on the classified pixels indicative of the roof structure. In particular, the system 10 determines the flat roof structure ratio based on the pixels classified as being flat and the pixels classified as being sloped according to Equation 1 below:

$$ratio_{flat} = \frac{N_{flat}}{(N_{slope} + N_{flat})} \quad \text{Equation 1}$$

Then, in step 74, the system 10 determines a ratio of the roof structure that is sloped based on the flat roof structure ratio. In particular, the system 10 determines the sloped roof structure ratio as the complement of the flat roof structure ratio according to Equation 2 below:

$$ratio_{slope} = 1 - ratio_{flat} \quad \text{Equation 2}$$

Figure 5:
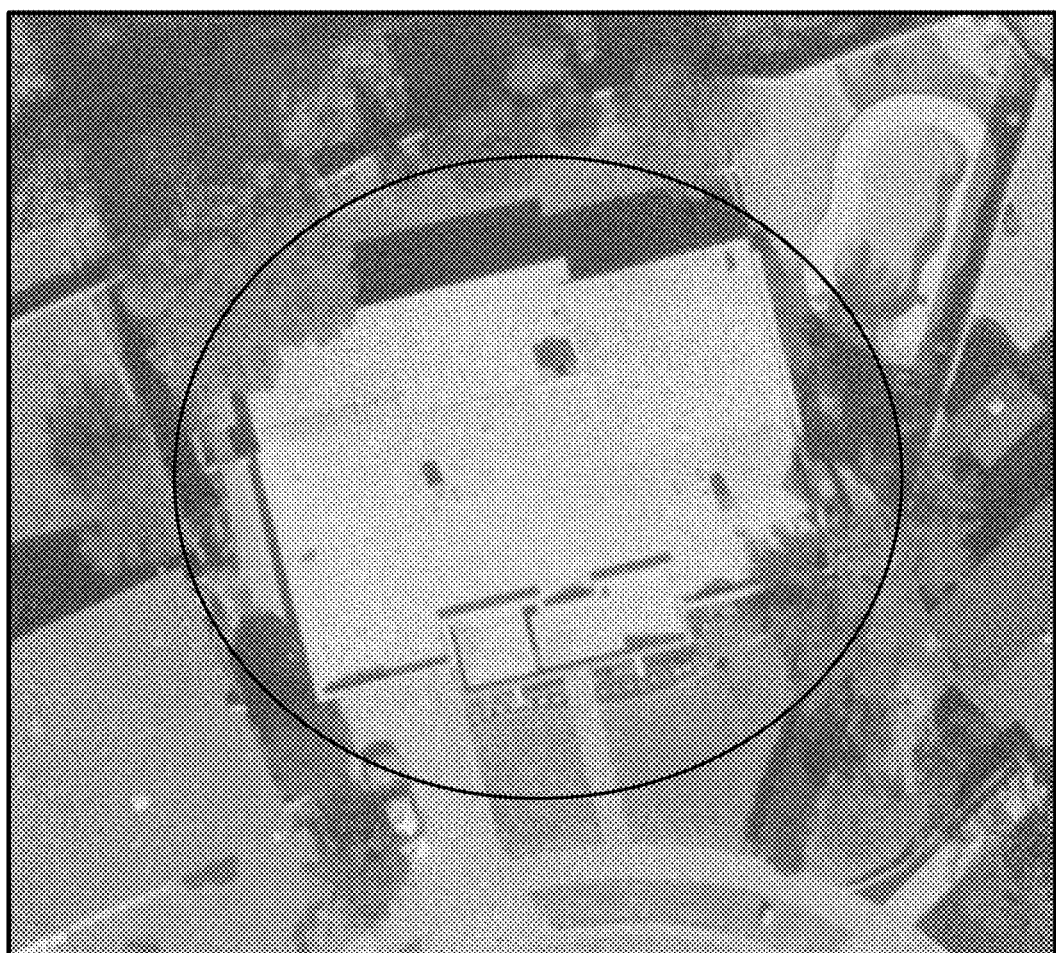
FIG. 5 is a diagram illustrating a flat roof structure.
Figure 6:
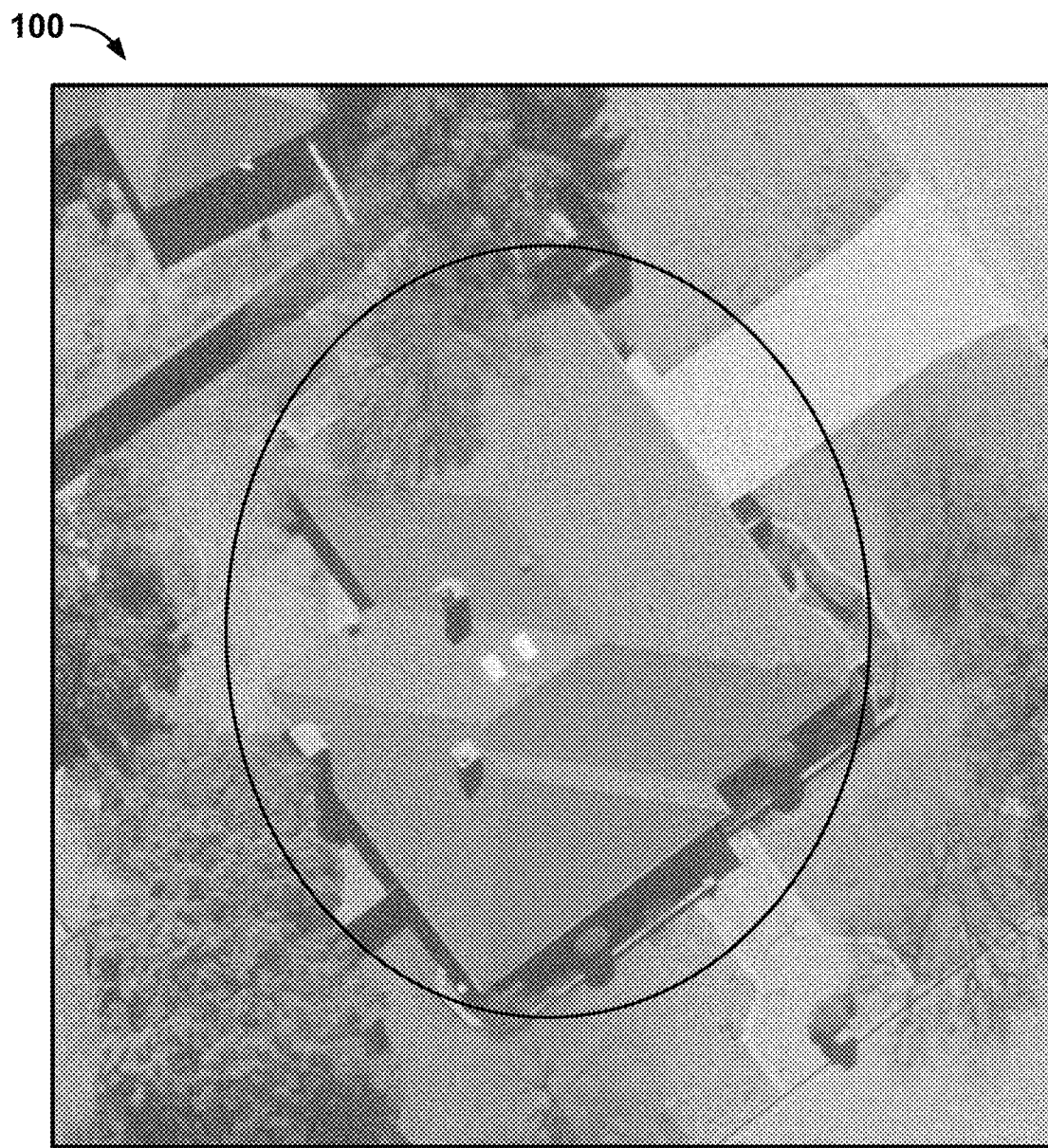
FIG. 6 is a diagram illustrating a hip roof structure.
Figure 7:
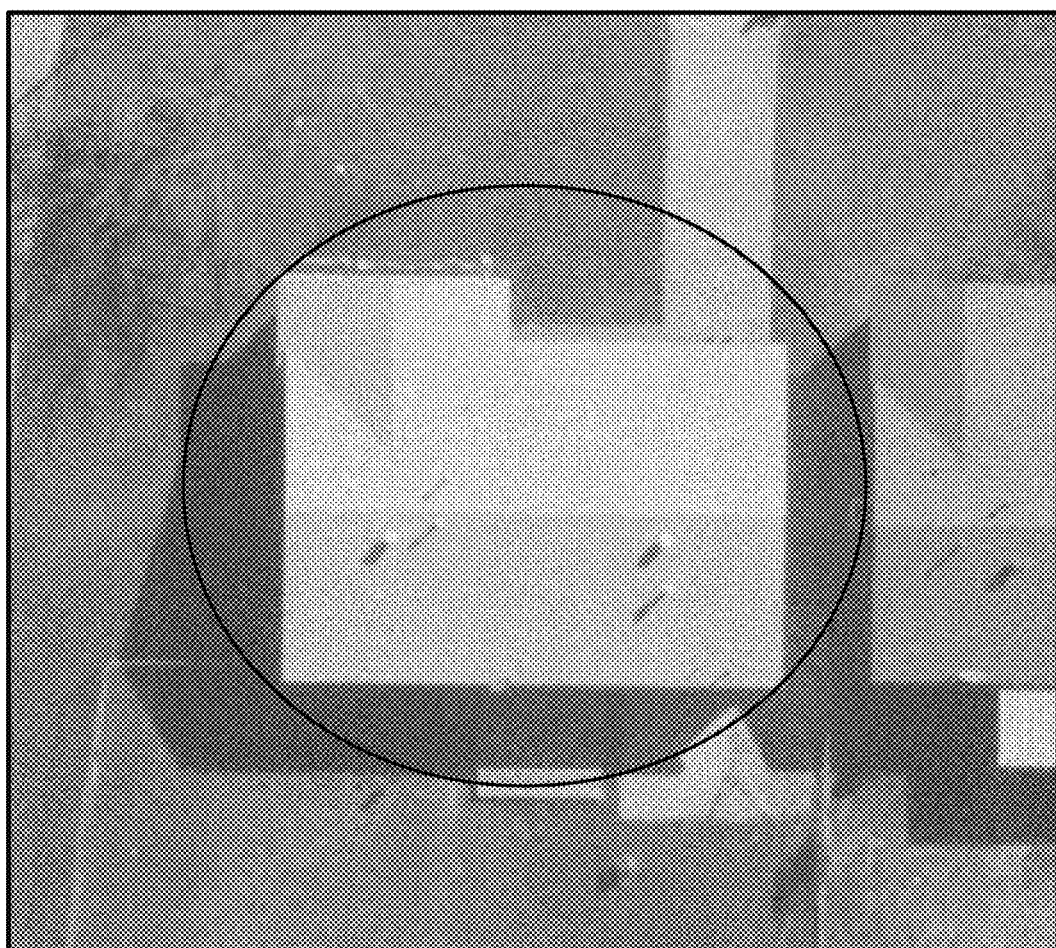
FIG. 7 is a diagram illustrating a gable roof structure.
Figure 8:
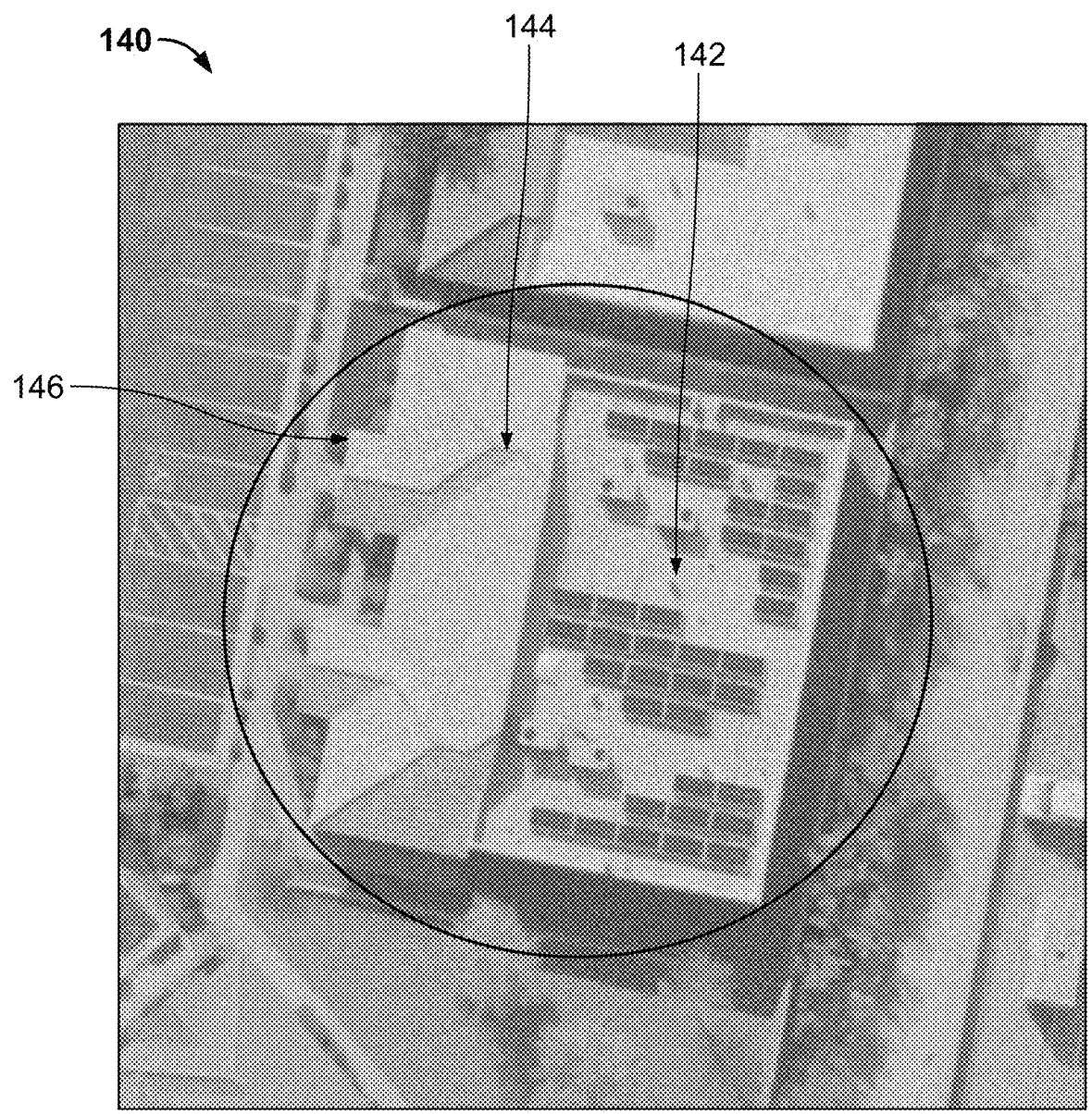
FIG. 8 is a diagram illustrating a roof structure having flat, hip and gable roof structure sections.

FIGS. 5-8 are diagrams illustrating various roof structure shapes associated with structures present in respective nadir aerial images. In particular FIG. 5 is a diagram 80 illustrating a flat roof structure, FIG. 6 is a diagram 100 illustrating a hip roof structure, FIG. 7 is a diagram 120 illustrating a gable roof structure, and FIG. 8 is a diagram 140 illustrating a roof structure having a flat roof structure section 142, a hip roof structure section 144 and a gable roof structure section 146. As described in further detail below with respect to FIGS. 9-11, the system 10 can determine a hip roof structure shape or a gable roof structure shape based on detected and classified roof lines of a roof structure and the sloped roof structure ratio.

Figure 9:
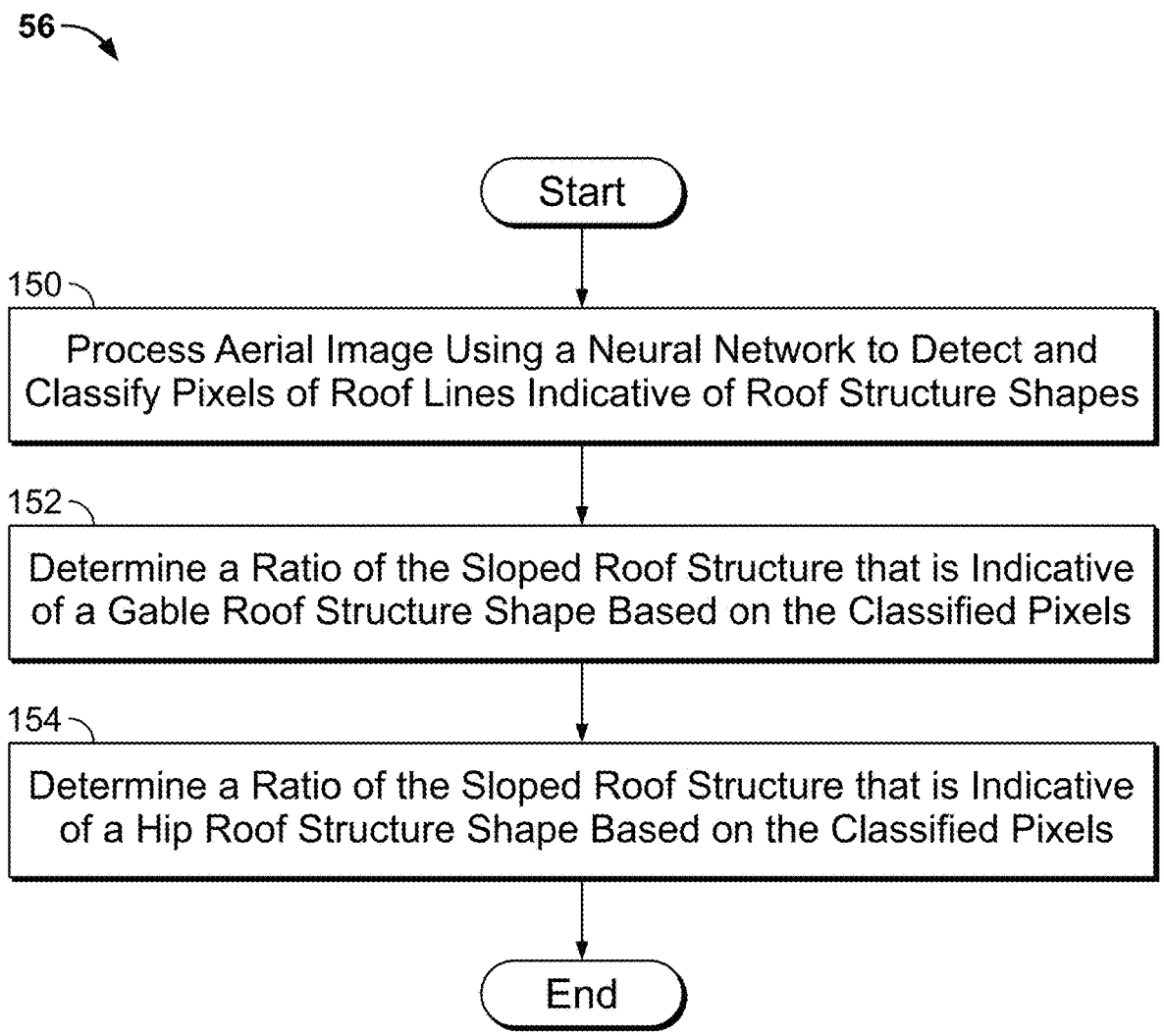
FIG. 9 is a flowchart illustrating step 56 of FIG. 2 in greater detail.
Figure 10:
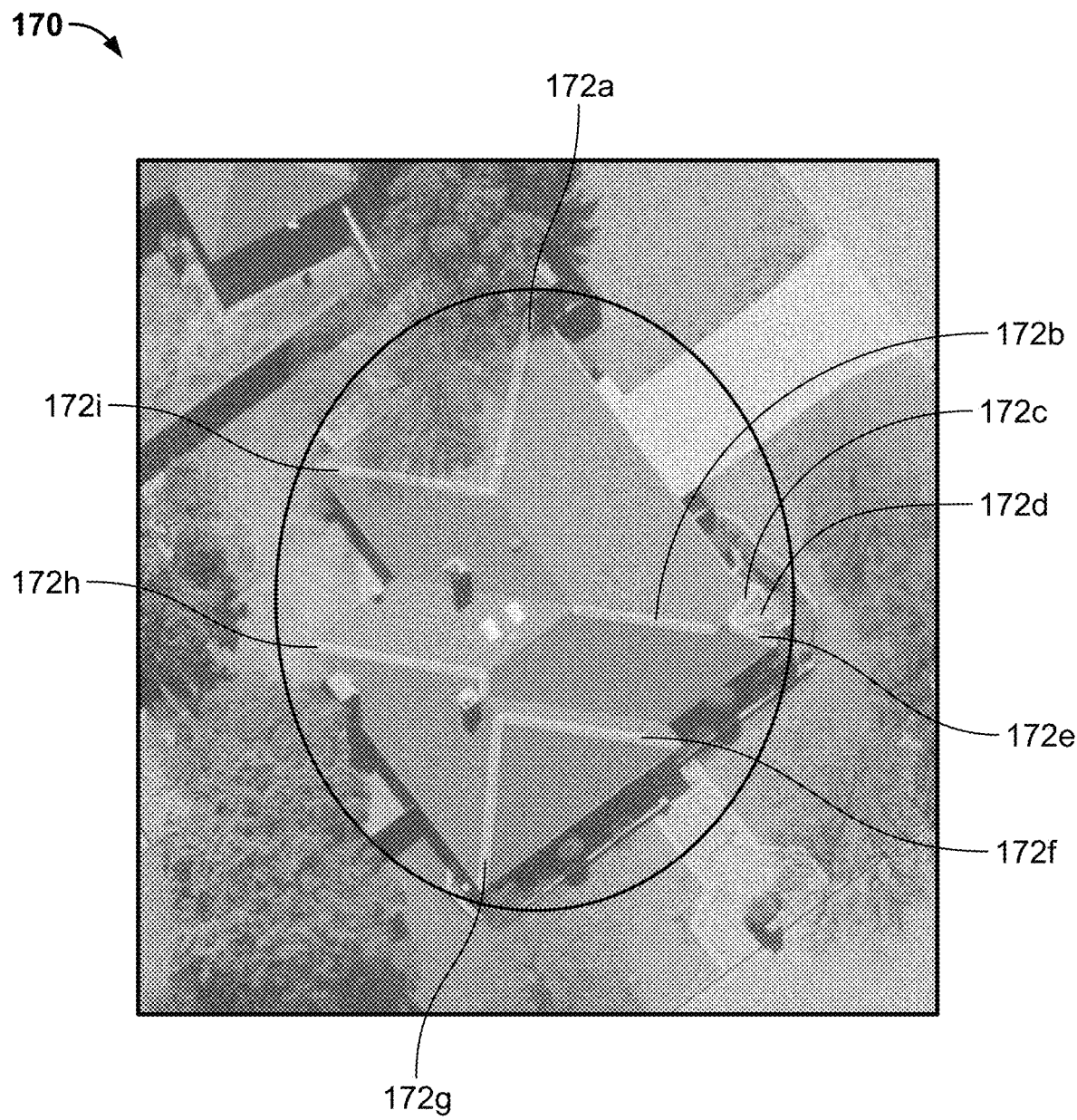
FIG. 10 is a diagram illustrating hip ridges of the roof structure of FIG. 6.
Figure 11:
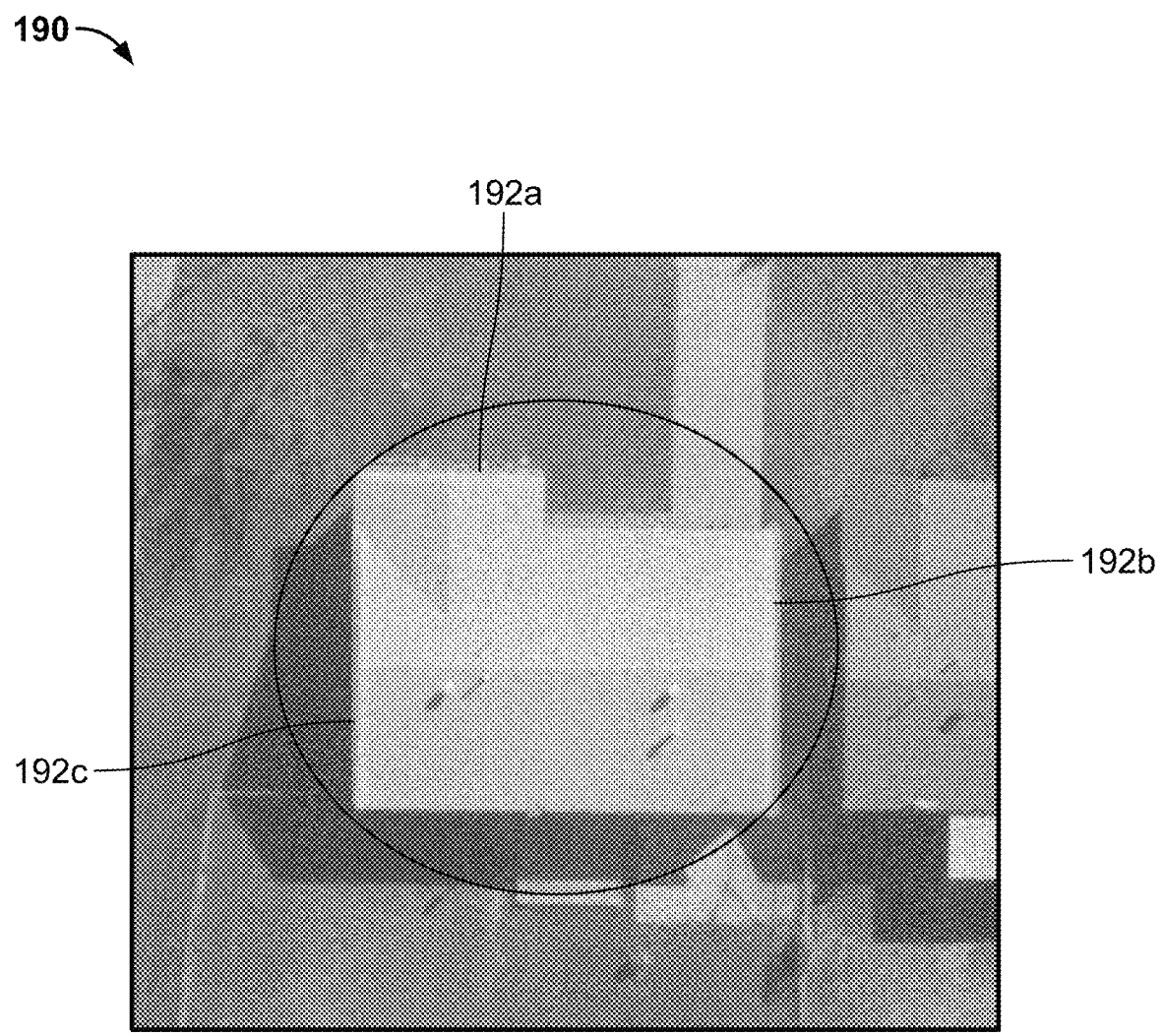
FIG. 11 is a diagram illustrating rake edges of the roof structure of FIG. 7.

FIG. 9 is a flowchart illustrating step 56 of FIG. 2 in greater detail. As mentioned above, the system 10 utilizes a neural network to detect and classify pixels of a roof structure present in the obtained image via segmentation. Similarly, in step 150, the system 10 processes an aerial image using a neural network to detect and classify pixels of roof lines (e.g., roof line segments) indicative of roof structure shapes such as a hip roof structure or a gable roof structure. It should be understood that the system 10 can utilize any neural network which is trained to detect and classify roof lines including, but not limited to, a hip ridge, a rake, a flat ridge, an eave, a sloped valley and a flat valley. For example, FIG. 10 is a diagram 170 illustrating the detection and classification of hip ridges 172a-i of the hip roof structure of FIG. 6 and FIG. 11 is a diagram 190 illustrating the detection and classification of rakes 192a-c of the gable roof structure of FIG. 7. As respectively shown in FIGS. 10 and 11, a hip ridge line can be defined as a sloped intersection between two adjacent roof planes and a rake line can be defined as a sloped edge having an adjacent roof plane.

Referring back to FIG. 9, the system 10 can detect and classify roof lines via several techniques including, but not limited to, line segment semantic segmentation and a line segment detection neural network. With respect to line segment semantic segmentation, the system 10 assigns each pixel a class of background or a line type label via a semantic segmentation convolutional neural network to yield an image mask of the roof segments. The system 10 can further refine these roof segments into respective line segments via traditional computer vision techniques (e.g., Hough lines, a Line Segment Detector (LSD) or object aligned bounding boxes). In addition to the line type label, the system 10 can train the neural network to learn additional features to assist in extracting specific line segments from an image. These features can include, but are not limited to, corner detection (e.g., an intersection of two or more roof lines), line orientation detection, roof gradient estimation and roof face type segmentation.

With respect to a line segment detection neural network, the system 10 can utilize an object detection sub network (e.g., a faster convolutional neural network (Faster R-CNN) or a Single Shot Detector (SSD) network) to detect corners and yield a candidate line segment for each unique pair of detected corners. The system 10 can construct a feature vector for each candidate line segment from neural network embedding sampled from points along the line segment. The system 10 subsequently classifies each candidate line segment via a sub network as either not a segment or a segment associated with a classification. Utilizing a line segment detection neural network can be advantageous over semantic segmentation followed by a non-learned segment extraction algorithm because it provides for a faster and more computationally efficient network architecture and requires fewer post processing steps to extract line segments.

Based on the neural network segmentation processing, in step 152, the system 10 determines a ratio of the sloped roof structure that is indicative of a gable roof structure shape based on the classified pixels according to Equation 3 below:

$$ratio_{gable} = ratio_{slope} * \frac{\sum l_{rake}}{\sum l_{rake} = c * \sum l_{hip}}$$ Equation 3

Then, in step 154, the system 10 determines a ratio of the sloped roof structure that is indicative of a hip roof structure shape based on the classified pixels according to Equation 4 below:

$$ratio_{hip} = ratio_{slope} * \frac{c * \sum l_{hip}}{\sum l_{rake} = c * \sum l_{hip}}$$ Equation 4

In Equations 3 and 4, l denotes a length of a roof line, and c denotes a constant to account for a hip segment being longer than a rake segment relative to an amount of a roof structure that a hip segment represents because a hip segment is orientated 45 degrees relative to a roof eave. The constant c can have a default value of $\sqrt{2}/2$, but this value can be adjusted utilizing hip and gable ratios if known values are available to account for systematic under/over estimation of line segment lengths.

Figure 12:
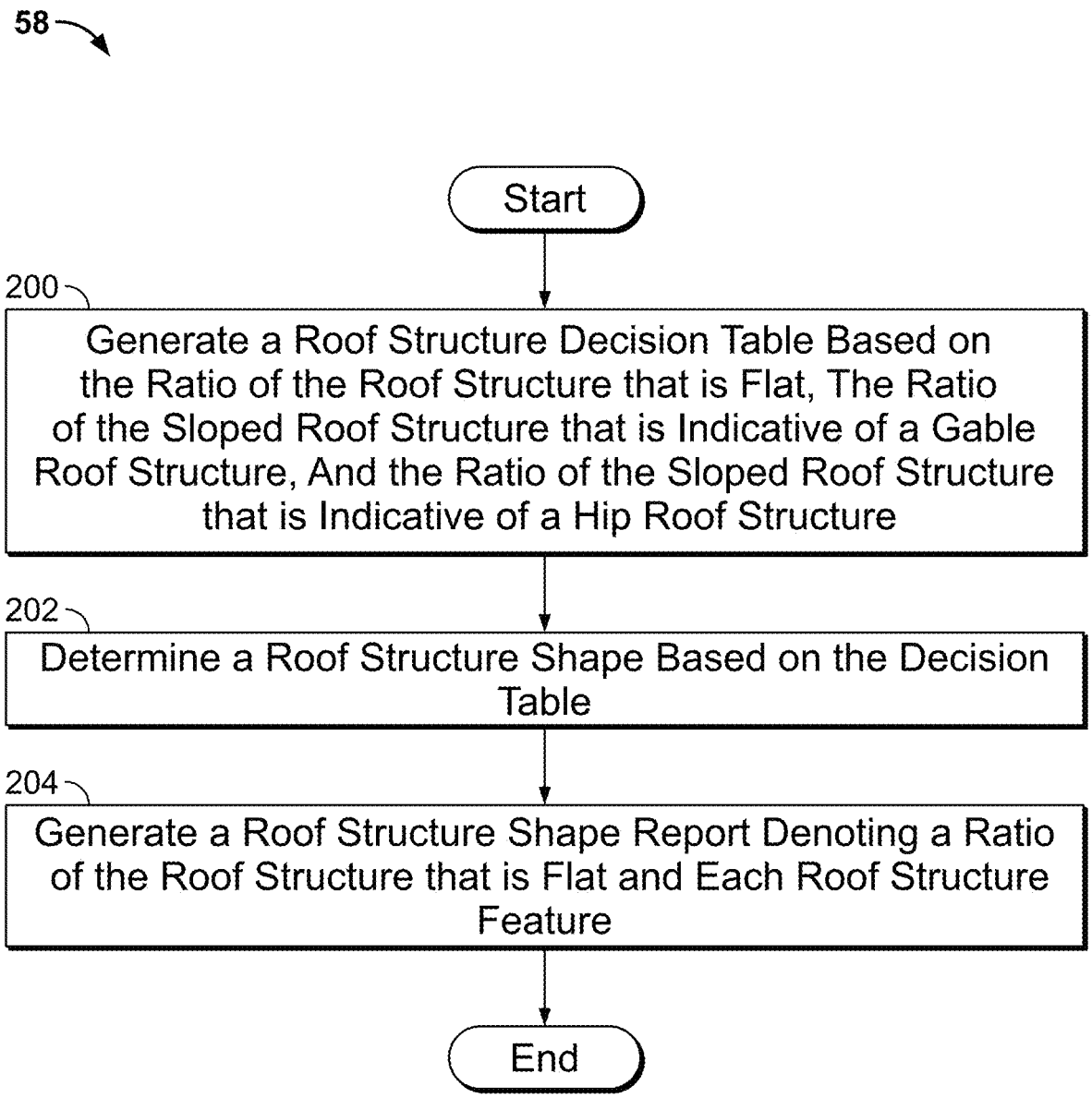
FIG. 12 is a flowchart illustrating step 58 of FIG. 2 in greater detail.

FIG. 12 is a flowchart illustrating step 58 of FIG. 2 in greater detail. In step 200, the system 10 generates a roof structure decision table based on the flat roof structure ratio, the ratio of the sloped roof structure that is indicative of a gable roof structure and the ratio of the sloped roof structure that is indicative of a hip roof structure. FIG. 13 is a diagram 220 illustrating a roof structure decision table. As shown in FIG. 13, the system 10 utilizes the roof structure decision table to determine a predominant shape of a roof structure (e.g., flat, gable or hip) based on whether particular features of the roof structure are true or false (e.g., flat>sloped or rake>hip). Accordingly and referring back to FIG. 12, in step 202, the system 10 determines a predominant shape of the roof structure based on the roof structure decision table. In step 204, the system 10 generates a roof structure shape report indicative of a predominant shape of the roof structure (e.g., flat, gable or hip) and ratios of each shape type of the roof structure (e.g., their respective contributions toward (percentages of composition of) the total roof structure). For example, FIG. 14 is a diagram 240 illustrating a roof structure shape report and FIG. 15 is a diagram 260 illustrating another embodiment of the roof structure shape report of FIG. 14.

Figure 16:
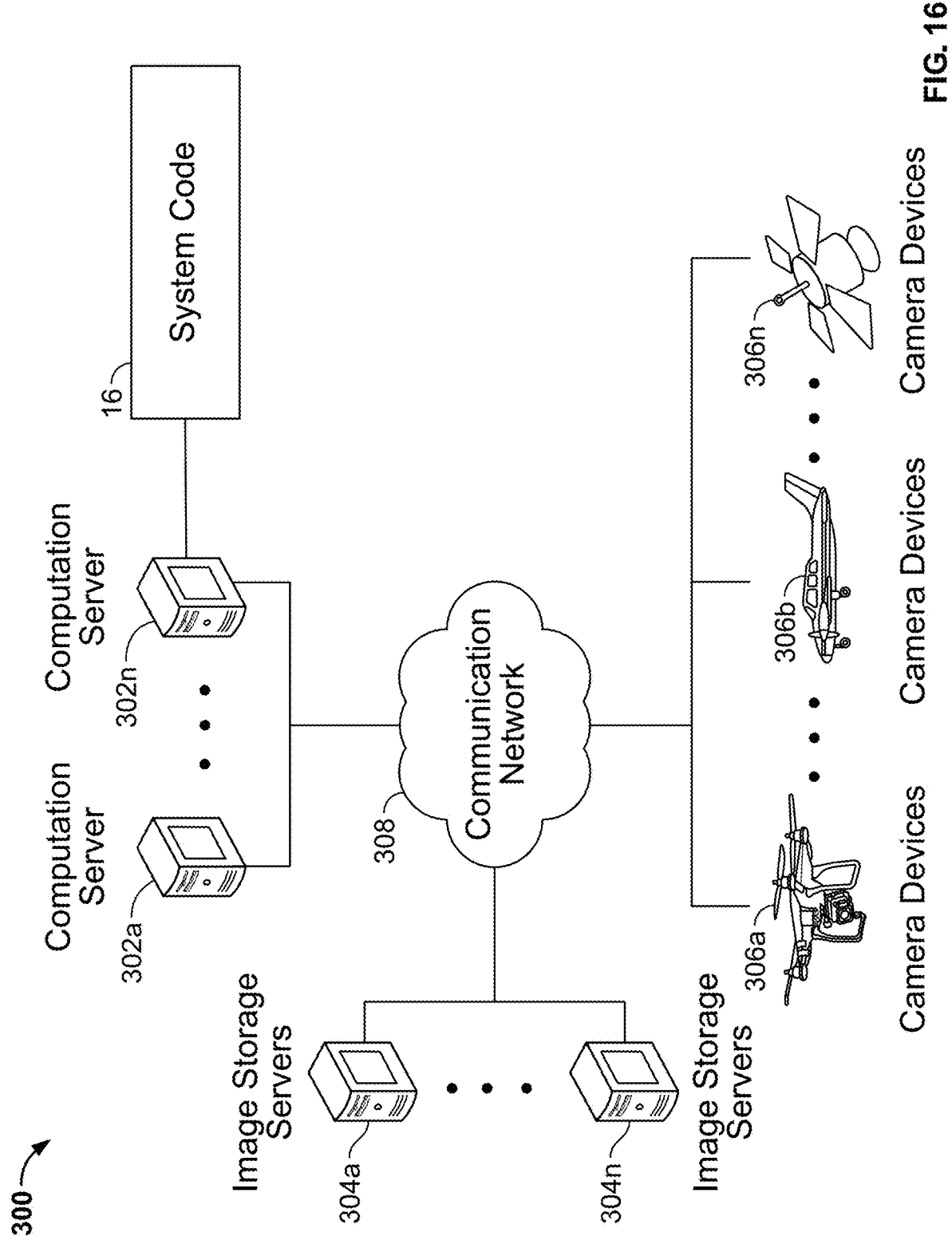
FIG. 16 is a diagram illustrating another embodiment of the system of the present disclosure.

FIG. 16 a diagram illustrating another embodiment of the system 300 of the present disclosure. In particular, FIG. 16 illustrates additional computer hardware and network components on which the system 300 could be implemented. The system 300 can include a plurality of computation servers 302a-302n having at least one processor and memory for executing the computer instructions and methods described above (which could be embodied as system code 16). The system 300 can also include a plurality of image storage servers 304a-304n for receiving image data and/or video data. The system 300 can also include a plurality of camera devices 306a-306n for capturing image data and/or video data. For example, the camera devices can include, but are not limited to, an unmanned aerial vehicle 306a, an airplane 306b, and a satellite 306n. The computation servers 302a-302n, the image storage servers 304a-304n, and the camera devices 306a-306n can communicate over a communication network 308. Of course, the system 300 need not be implemented on multiple devices, and indeed, the system 300 could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A computer vision system for determining roof shapes from imagery, comprising:
   a memory storing at least one image of a structure having a roof structure; and
   a processor in communication with the memory, the processor programmed to perform the steps of:
      retrieving the at least one image of the structure from the memory;
      processing the at least one image of the structure using a neural network to determine a flat roof structure ratio and a sloped roof structure ratio;
      determining at least one ratio of roof structure types using the neural network; and
      generating and transmitting a roof structure shape report indicative of a predominant shape of the roof structure based on the at least one ratio of roof structure types.

2. The system of claim 1, wherein the roof structure shape report includes the at least one ratio of roof structure types.

3. The system of claim 1, wherein the neural network comprises a convolutional neural network.

4. The system of claim 1, wherein the flat roof structure ratio represents a portion of the roof structure classified by the neural network as being flat.

5. The system of claim 4, wherein the sloped roof structure ratio represents a portion of the roof classified by the neural network as being sloped.

6. The system of claim 1, wherein the neural network determines the at least one ratio of roof structure types based on roof lines of the roof structure detected by the neural network.

7. The system of claim 1, wherein the predominant shape of the roof structure comprises one or more of a flat roof shape, a hip roof shape, or a gable roof shape.

8. The system of claim 7, wherein the at least one ratio indicates a contribution of a roof shape to a total roof structure.

9. The system of claim 1, wherein the system retrieves the at least one image based on a geospatial region of interest.

10. The system of claim 1, wherein the neural network processes the at least one image to detect and classify pixels of the at least one image via segmentation.

11. The system of claim 10, wherein the neural network determines the flat roof structure ratio based on classified pixels of the at least one image indicative of the roof structure.

12. The system of claim 1, wherein the neural network determines the sloped roof structure ratio based on the flat roof structure ratio.

13. The system of claim 1, wherein the neural network processes the at least one image to detect and classify pixels of roof lines that are indicative of roof structure shapes.

14. The system of claim 13, wherein the sloped roof structure ratio indicates a gable roof structure and is based on the classified pixels.

15. The system of claim 13, wherein the sloped roof structure ratio indicates a hip roof structure shape and is based on the classified pixels.

16. The system of claim 15, wherein the processor generates a roof structure decision table based on the flat roof structure ratio, a sloped roof structure ratio indicative of a gable roof, and a sloped roof structure ratio indicative of a hip roof structure shape.

17. The system of claim 16, wherein the processor determines a roof structure shape based on the decision table.

18. A computer vision method for determining roof shapes from imagery, comprising the steps of:
retrieving by a processor at least one image of a structure stored in a memory;
processing the at least one image of the structure using a neural network to determine a flat roof structure ratio and a sloped roof structure ratio;
determining at least one ratio of roof structure types using the neural network; and
generating and transmitting a roof structure shape report indicative of a predominant shape of the roof structure based on the at least one ratio of roof structure types.

19. The method of claim 18, wherein the roof structure shape report includes the at least one ratio of roof structure types.

20. The method of claim 18, wherein the neural network comprises a convolutional neural network.

21. The method of claim 18, wherein the flat roof structure ratio represents a portion of the roof structure classified by the neural network as being flat.

22. The method of claim 21, wherein the sloped roof structure ratio represents a portion of the roof classified by the neural network as being sloped.

23. The method of claim 18, further comprising determining the at least one ratio of roof structure types based on roof lines of the roof structure detected by the neural network.

24. The method of claim 18, wherein the predominant shape of the roof structure comprises one or more of a flat roof shape, a hip roof shape, or a gable roof shape.

25. The method of claim 24, wherein the at least one ratio indicates a contribution of a roof shape to a total roof structure.

26. The method of claim 18, further comprising retrieving the at least one image based on a geospatial region of interest.

27. The method of claim 18, further comprising processing the at least one image to detect and classify pixels of the at least one image via segmentation.

28. The method of claim 27, further comprising determining the flat roof structure ratio based on classified pixels of the at least one image indicative of the roof structure.

29. The method of claim 18, further comprising determining the sloped roof structure ratio based on the flat roof structure ratio.

30. The method of claim 18, further comprising processing the at least one image to detect and classify pixels of roof lines that are indicative of roof structure shapes.

31. The method of claim 30, wherein the sloped roof structure ratio indicates a gable roof structure and is based on the classified pixels.

32. The method of claim 30, wherein the sloped roof structure ratio indicates a hip roof structure shape and is based on the classified pixels.

33. The method of claim 32, further comprising generating a roof structure decision table based on the flat roof structure ratio, a sloped roof structure ratio indicative of a gable roof, and a sloped roof structure ratio indicative of a hip roof structure shape.

34. The method of claim 33, further comprising determining a roof structure shape based on the decision table.

* * * * *